US008884969B2

(12) United States Patent
Dangler et al.

(10) Patent No.: US 8,884,969 B2
(45) Date of Patent: Nov. 11, 2014

(54) METHOD AND SYSTEM FOR PROVIDING A THREE-DIMENSIONAL PREVIEW OF A FINISHED DOCUMENT

(75) Inventors: Paul Edward Dangler, Webster, NY (US); Robert John Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 622 days.

(21) Appl. No.: 13/026,435

(22) Filed: Feb. 14, 2011

(65) Prior Publication Data
US 2012/0206439 A1 Aug. 16, 2012

(51) Int. Cl.
*G06T 13/00* (2011.01)
*G06T 15/00* (2011.01)
*G06F 3/12* (2006.01)

(52) U.S. Cl.
CPC ............ *G06F 3/1256* (2013.01); *G06F 3/1282* (2013.01); *G06F 3/1272* (2013.01); *G06F 3/1208* (2013.01); *G06F 3/1285* (2013.01); *G06T 15/00* (2013.01)
USPC ........................................................ 345/473

(58) Field of Classification Search
None
See application file for complete search history.

(56) References Cited

U.S. PATENT DOCUMENTS

2004/0027352 A1* 2/2004 Minakuchi .................... 345/473
2006/0114490 A1* 6/2006 Rolleston ..................... 358/1.14
2007/0268513 A1 11/2007 Enloe

OTHER PUBLICATIONS

U.S. Appl. No. 12/900,035, filed Oct. 7, 2010, Rolleston et al.

* cited by examiner

*Primary Examiner* — Edward Martello
(74) *Attorney, Agent, or Firm* — Luis M. Ortiz; Kermit D. Lopez; Ortiz & Lopez, PLLC

(57) ABSTRACT

A method and system for providing three-dimensional preview of a finished document based on a key feature analysis. The document can be analyzed by a document analysis algorithm configured in association with a document visualization module in order to identify a number of key features associated with the document. A viewing script can be created with respect to the key features of the document in order to drive a visualization engine. A document-specific visual animation of the key features can be visually displayed based on the viewing script at a user interface in order to preview the finished document. A list of critical features with respect to the document can be selected and previewed by a user via a set of media controls displayed at the user interface.

20 Claims, 5 Drawing Sheets

METHOD AND SYSTEM FOR PROVIDING A THREE-DIMENSIONAL PREVIEW OF A FINISHED DOCUMENT

TECHNICAL FIELD

Embodiments are generally related to document production visualization methods and systems. Embodiments are additionally related to techniques for previewing finished documents.

BACKGROUND OF THE INVENTION

Document production environments, such as networked or non-networked print shops, convert printing orders, such as print jobs, into finished printed material. A print shop may process the print jobs utilizing resources such as, for example, printers, cutters, collators, and other similar equipment. Typically, resources in the print shops can be organized such that when a print job arrives from a customer at a particular print shop, the print job can be processed by performing one or more production functions. Print shops and devices within such shops may communicate with one another by way of a network.

Networked production devices, such as printers, can interact with an assemblage of other production devices, client devices, servers, and other components that are connected to and communicate over a network in the context of such print shop production environments. Web-to-print submission of the print job to the production print environments can be employed to produce large quantities of print documents in a single production run sometimes with complex finishing requirements. The document and job specifications must be verified in order to produce the resulting printed materials based on a user expectation. Conventionally, the document and job specifications can be verified by examining a textual content of a job ticket, which is prone to errors due to the quantity, complexity, and details of the data.

Document visualization provides a jeans of ensuring that the document content, method of binding/finishing, and any ancillary services such as cutting, folding, or inserting tabs, are correctly defined for the rendering job. The majority of prior art document visualization preview systems provide a two-dimensional view of the pages of the document. Such two-dimensional views are unable to visually represent all aspects of the finished document when a user is creating a larger bound document. Consequently, a virtual three-dimensional preview can be employed to generate a virtual rendering with respect to the completed rendering job within the network. The controls associated with moving an object in such prior art three-dimensional view are more complex and requires manual navigation to regions of interest in the document, which can be very time-consuming and confusing for users who are not familiar with three-dimensional viewing controls.

Based on the foregoing, a need exists for an improved method and system for providing intelligent three-dimensional preview of a finished document based on analysis of key features of the document, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved document production visualization (DPV) system and method.

It is another aspect of the disclosed embodiments to provide for an improved system and method for providing a three-dimensional preview of a finished document based on key feature analysis.

It is a further aspect of the present invention to provide for an improved system and method for providing a two-dimensional preview of a finished document based on a key feature analysis.

The aforementioned aspects and other objectives and advantages can now be achieved as described herein. A system and method for providing a three-dimensional preview of a finished document based on a key feature analysis, is disclosed herein. The document can be analyzed by a document analysis algorithm configured in association with a document visualization module in order to identify a number of key features (e.g., binding type, presence of tabs, chapter breaks, cover material, content, etc.) associated with the document. A viewing script can be created with respect to the key features of the document in order to drive a visualization engine (e.g., a 3D visualization engine or a 2D visualization engine). A document-specific visual animation of the key features can be visually displayed based on the viewing script at a user interface in order to preview the finished document. A list of critical features with respect to the document can be selected and previewed by a user via a set of media controls (e.g., start, stop, skip-forward, skip-back) displayed at the user interface.

A three-dimensional visual animation of the key features associated with the document can be displayed at the user interface in order to preview the finished document. The viewing script with respect to the document can be displayed along with descriptive text by the visualization engine. Such virtual rendering can be employed to preview aspects of the job at a plurality of levels such as book, sheet, page, image, font, and rendering. Such an approach speeds document preparation and approval and permits users to produce new and interesting documents. Additionally, with such an approach, users do not need to learn how to operate complex controls that would allow 3-D manipulation of a preview of their document.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
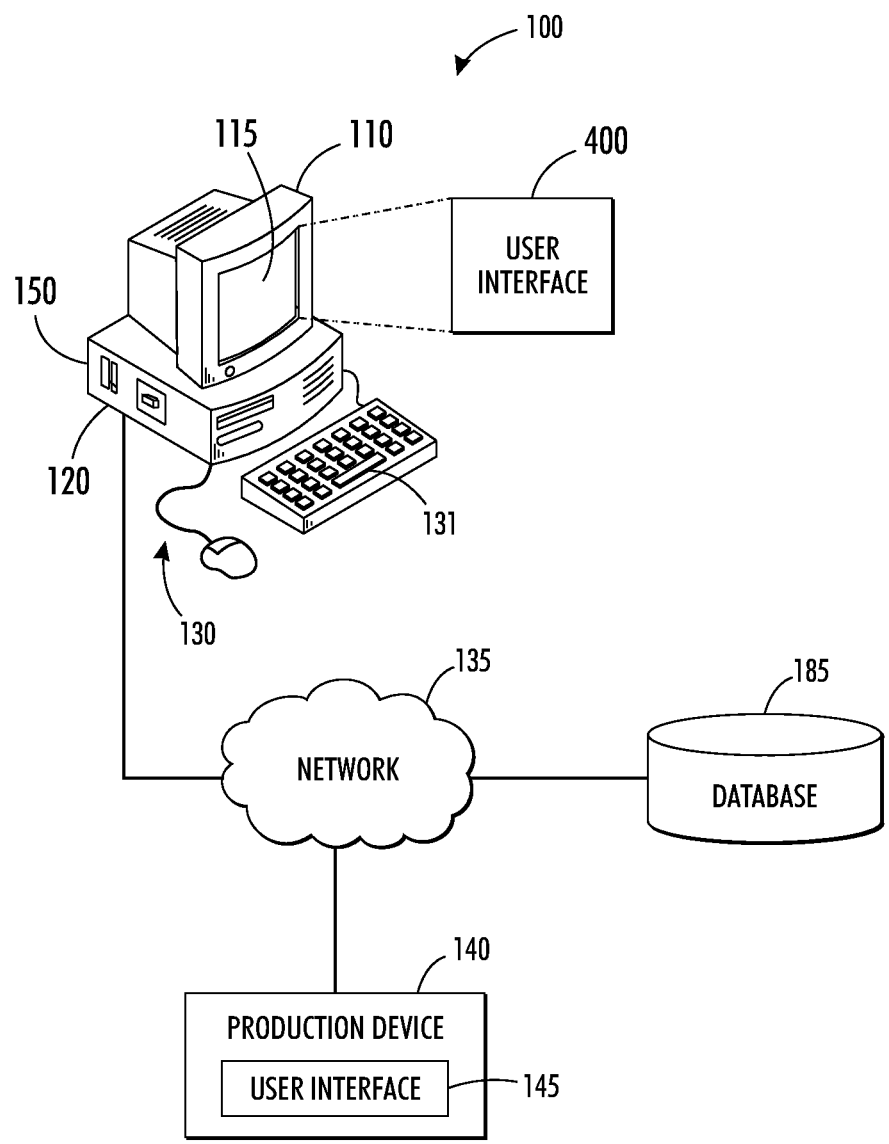
FIG. 1 illustrates an example of a production device that can communicate with a data-processing apparatus through a network, in accordance with the disclosed embodiments.

Referring to FIG. 1, system 100 can include a production device 140 that can communicate with a data-processing apparatus 110 through a network 135. The network 135 can also communicate with a database 185. In some embodiments, production device 140 may be a device such as a printer, scanner, copy machine, workstation, mobile display, or a combination thereof, etc. In other embodiments, the production device 140 may be a print production device. The data-processing apparatus 110 may be, for example, a personal computer or other computing device and generally includes a central processor 120, a display device 115, a keyboard 131, and a pointing device 130 (e.g., mouse, track ball, pen device, touch, tactile, haptic, or the like). Additional input/output devices, such as the production device 140, may be included in association with the data-processing apparatus 110 as desired.

Figure 2:
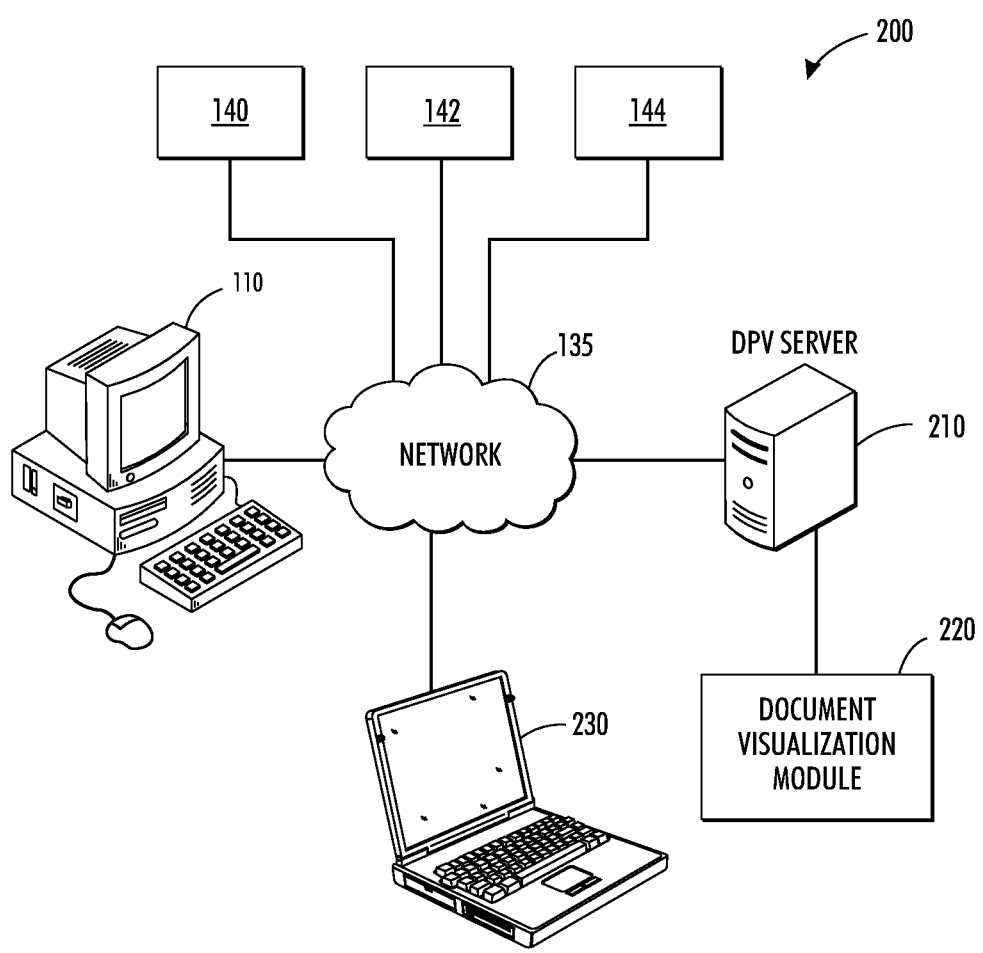
FIG. 2 illustrates a graphical representation of a document production visualization system associated with a network, in accordance with the disclosed embodiments.

Note that as utilized herein, the term production device may refer to an apparatus or system such as a printer, scanner, fax machine, copy machine, etc., and/or a combination thereof (e.g., an MFD). Preferably, production device 140 is capable of multiple rendering functions such as printing, copying, scanning, faxing, etc. In some embodiments, the production device 140 may be implemented with a single rendering function such as printing. In other embodiments, the production device 140 can be configured to provide multiple rendering functions such as scanning, faxing, printing and copying. Note that the devices 142 and 144 illustrated herein with respect to FIG. 2 are generally analogous or similar to device 140. Machines such as devices 140, 142, and 144 may also be capable of inserting, folding, finishing, and binding. Note that many production devices include finishing capabilities such as inserting folding, finishing, bonding, etc., but it is not required that they do.

Figure 3:
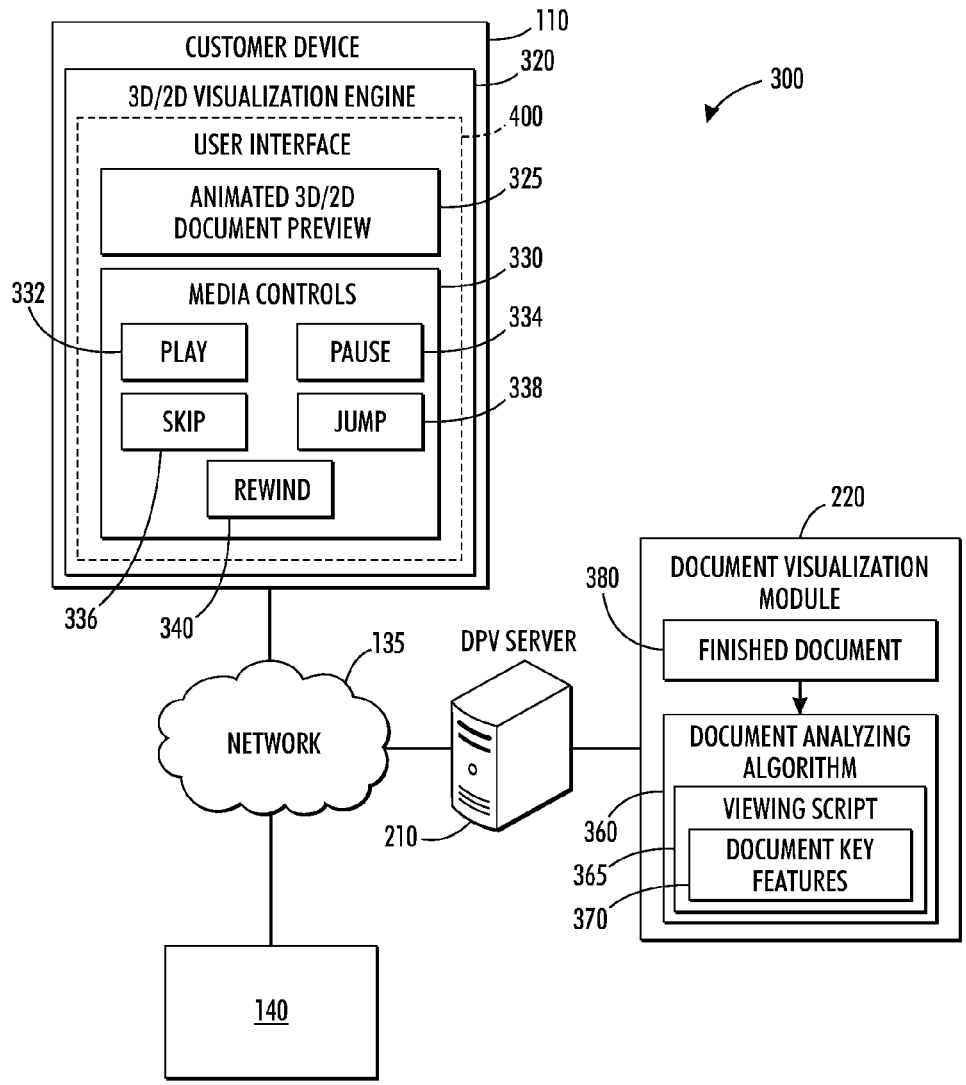
FIG. 3 illustrates a block diagram of the document production visualization system for providing a 2D/3D preview of a finished document, in accordance with the disclosed embodiments.

Note that the systems 100, 200, and/or 300 depicted herein with respect to FIGS. 1, 2, and 3 can be implemented in the context of, for example, a print production shop or a similar "print shop" environment. An example of a print product shop or a print shop environment is disclosed in U.S. Pat. No. 7,791,752, entitled "Dynamic Offer Generation Based on Print Shop Machine Load," which issued to Reiner Eschbach on Sep. 7, 2010 and is incorporated herein by reference in its entirety. Another example of a print production shop or a print shop environment is disclosed in, for example, U.S. Pat. No. 7,430,056, entitled "System and Method of Evaluating Print Shop Consolidation Options in an Enterprise," which issued to Rai et al. on Sep. 30, 2008 and is incorporated herein by reference in its entirety. A print shop environment may be; for example; a single entity or business enterprise or may be a variety of different types of print shop production systems from different entities that communicate with one another via a distributed computer network, depending upon design considerations. A further example of a print shop environment in which the embodiments disclosed herein can be implemented is disclosed in U.S. patent application Ser. No. 12/900,035, which was filed on Oct. 7, 2010, and is entitled "Method and System for Providing Virtual Rendering Alerts for Rendering Job Page Exceptions". U.S. patent application Ser. No. 12/900,035 is also incorporated herein by reference in its entirety.

The data-processing apparatus 110 shown in FIG. 1, for example, can be coupled to the production device 140 (and other production devices) through a computer network 135 in the context of a print shop environment. A network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The production device 140 can include its own user interface 145 such as a panel menu or other appropriate interface configuration. Note that such a user interface 145 can be used to select features and enter other data into the production device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the production device 140.

The data-processing apparatus 110 also includes a GUI 400 that allows a user to interact with the data-apparatus 110 and also the network 135 and networked devices such as the production device 140 shown in FIG. 1. The user interface 400 displays information and receives data through device display and/or the keyboard/mouse combination. The user interface 400 also serves to display results, whereupon the user may supply additional inputs or terminate a given session. The data-processing apparatus 110 can be, for example, any computing device capable of being integrated within a network such as a PDA, personal computer, cellular telephone, server, etc.

The following description is presented with respect to embodiments of the present invention, which can be embodied in the context of a data-processing apparatus 210 and production device 140 depicted in FIG. 3. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

FIG. 2 illustrates a graphical representation of a document production visualization (DPV) system 200 associated with a network 135, in accordance with the disclosed embodiments. The document production visualization system 200 generally includes a network infrastructure 135 associated with one or more networked production devices 140, 142, and 144, data-processing system 110, a mobile communication device (e.g., a laptop) 230, and a document production visualization (DPV) server 210. Data-processing system 110 depicted in FIG. 2 can be, for example, a server. Other devices such as, for example, desktops, network devices, palmtops, mobile phones, etc may also be included in the network 135 as service providers. The production devices 140, 142, and 144 can be located remotely with respect to each other, or alternatively, they may be located locally with respect to each other.

A document visualization module 220 associated with the document production visualization server 210 can be adapted for providing a three-dimensional view and/or a two-dimensional view of a finished document. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as USB drives, Flash drives, hard disk drives, CD ROMs, CD-Rs, DVDs, etc., and transmission media, such as digital and/or analog communication links. Examples of transmission media can also include devices such as modems, which permit information to be transmitted over standard telephone lines and/or the more advanced digital communications lines.

FIG. 3 illustrates a block diagram of the document production visualization system 300 for providing a 3D/2D preview 325 of an input document 380 utilizing the document visualization module 220, in accordance with the disclosed embodiments. The document production visualization system 200 provides visualization of salient aspects resulting from the print specifications of individual rendering jobs. The system 200 generally includes a customer device 110, the document production visualization server 210, and the document visualization module 220 that are operatively configured in association with the network 135. The document production visualization system 200 can be employed for virtually displaying the finished document 380 in a wide range of networked rendering applications.

The document 380 can be analyzed by a document analysis algorithm 360 configured in association with the document visualization module 220 in order to identify the key features 370 associated with the document 380. The finished document 380 may include one or more images in electronic form which is to be rendered on a print media by the production device 140 and may include text, graphics, pictures, and the like. The key features 370 can be, for example, document thickness, presence of front and back cover text or images, presence of side/spine text or images, pages of different material thickness, pages of different sizes (fold-out pages), glossy papers, presence of text or image information close to holes or edges of pages, presence of tabs, type of binding (e.g. 3-ring, coil, tape), page transitions from portrait to landscape format, and the like.

A viewing script 365 can be created based on the key features 370 of the document 380 in order to drive a visualization engine 320 associated with the customer device 110. Note that the visualization engine 320 can be, for example, a 3D visualization engine or a 2D visualization engine, depending upon design considerations. A three-dimensional document-specific visual animation 325 of the key features 370 associated with the document 380 can be visually displayed based on the viewing script 365 at the user interface 400 of the customer device 110 in order to preview the finished document 380.

In general, the three-dimensional visual animation provides a virtual reality experience for a user in order to view the document 380 from a variety of angles. The process of creating the three-dimensional animation can be sequentially divided into three basic phases, 3D modeling which describes the process of forming the shape of the document, layout and animation which describes the motion and placement of the document within a scene, and 3D rendering which displays the document 380. Note that the customer device 110 disclosed herein can be a data processing system 110 and/or a mobile communication device 230 such as, for example, a laptop, a PDA, a mobile device and a Smartphone, etc.

Figure 4:
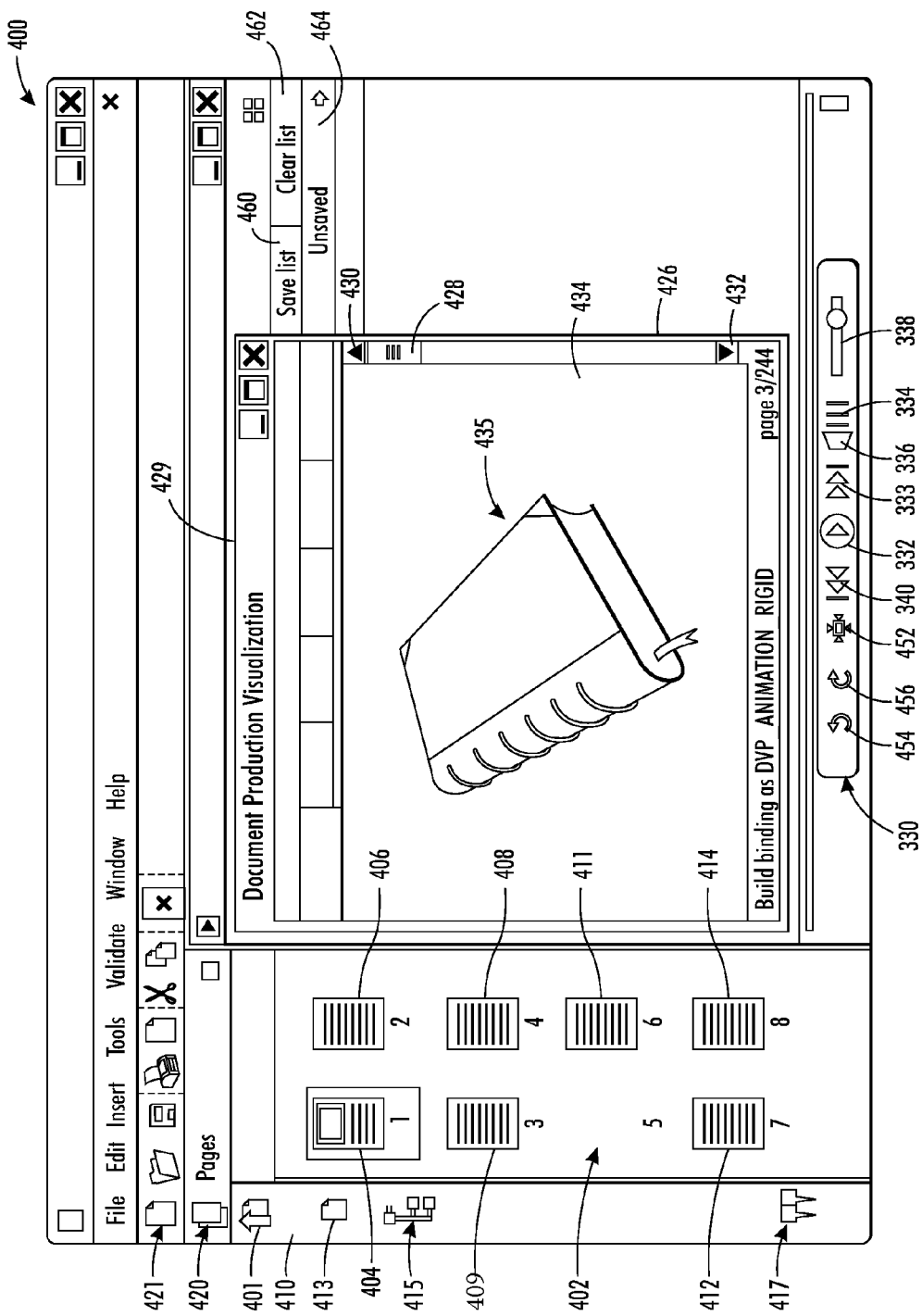
FIG. 4 illustrates an exemplary GUI illustrating a three-dimensional preview of a finished document associated with various media controls, in accordance with the disclosed embodiments.

A list of critical features with respect to the document 380 can be selected and operated via a set of media controls 330 displayed at the user interface 400. The set of media controls can be, for example, a play/stop control 332, a pause button 334, a skip control 336, a jump control 338 that allows a user to "jump" to a selected 'document characteristic' (analogous to a movie player, and navigating to a particular scene), a rewind button 340, a zoom button for zooming in/out at any frame or sequence, a control to mark for later review, and the so on. It will be apparent, however, to those skilled in the art that other controls can be included as desired without departing from the scope of the invention. Additional controls and features are depicted in FIG. 4. Note that a two-dimensional visual animation of the key features 370 of the document 380 can also be displayed at the user interface 400 in order to preview the finished document 380.

FIG. 4 illustrates one possible example of an implementation of graphical user interface 400, in accordance with the disclosed embodiments. The graphical user interface 400 is preferably presented to a user in the context of a "Windows" environment that graphically displays a variety of selectable graphical buttons, icons, and controls that can be selected by a user to assist in graphically rendering a three-dimensional preview of the finished document 380. Various areas within graphical user interface 400 constitute different and exemplary embodiments.

The graphical user interface 400 includes, for example, media controls 330, which can include the aforementioned play/stop control 332, pause button 334, skip control 336, a jump control 338 for "jumping" to salient features, rewind button 340, a forward button 333, along with other controls such as a zoom button 452 for zooming in/out at any frame or sequence. Additional media controls include reverse and forward "refresh" buttons 454 and 456. Note that in a simplest embodiment of graphical user interface 400, a user would only be presented with the play/stop control 332. This basic user control would simply allow for a view of the entire animation script.

The graphical user interface 400 additionally includes a graphical display area 402 for displaying one or more thumbnails such as thumbnails 404, 406, 408, 410, 411, 412, and 414. Each such thumbnail may be, for example, a "page" from a graphical representation 435 of a document (e.g., a book) graphically displayed within a display area 434 of a document production visualization window 429. Note that the document visualization module 220 described herein can include instructions for the operation and display of the window 429. Note that document visualization module 220 associated with the DPV server 210 can be employed to generate the animated 3D/2D document preview 325, which may be displayed at the user interface 400 in, for example, window 429 along with key features 370 associated with the finished document 380. The window 429 can include graphical buttons such as, for example, a graphical "up" arrow 430, a graphical "down" arrow 432 along with a graphically displayed scroll key 428 that when selected, allows a user to scroll up and down the document displayed within graphical display area 434 of window 429.

Displayed to the left of the area 402 is a display area 409, which is shaped in a vertical column and includes additional graphical buttons 401, 413, 415 and 417. Graphical button 417, for example, when selected by a user allows for the addition of comments to a document. Graphical button 415, on the other hand, allows a user to implement flowcharting and logic flow analysis features with respect to a document. Graphical button 413 allows a user to "save" a document or particular aspects of a document.

Other embodiments include the ability to provide for a list of salient features determined by the document analysis. Graphical control button 460 when selected by a user allows a list of such salient features to be saved. Graphical control button 462 when selected by a user permits the user to clear such a list. Additionally, graphical control button 464 when selected by a user lists salient features that have not been saved. Other embodiments include, for example, a graphical button 420 that when selected by a user permits a "pages" view of the pages in a particular document or a graphical toolbar 421 that includes various selectable icons that when selected permit a user to save, print, "cut" text, and so forth.

The graphical user interface 400 depicted in FIGS. 1, 3, and 4 herein can be provided by a module such as, for example, module 220 (i.e., a software application). The graphical user interface 400 can be displayed via a display device such as the display 115 depicted in FIG. 1.

Note that in computing, a graphical user interface window is generally a visual area containing some type of user interface (e.g., graphical user interface 400). Such a "window" usually (but not always) possesses a rectangular shape and displays the output of and may allow input to one or more processes. Such windows are primarily associated with graphical displays, where they can be manipulated with a mouse cursor such as, for example, the pointing device 130 depicted in FIG. 1. A GUI using windows as one of its main "metaphors" is often referred to as a windowing system.

The viewing script 365 of the input document 380 generated by the document analysis algorithm 360 (e.g., a module) can be provided to the visualization engine 320 associated with the customer device 110 in order to produce the 3D/2D preview 325 of the document 380. The three-dimensional view of the document 380 permits the user to select the features 370 with respect to the input document 380 utilizing the media controls 330 via the user interface 400. A user can interact with the user interface 400 to select and operate such options by "pointing" and "clicking" with a user input device such as, for example, a touch screen, a key board, a mouse, and the like.

A particular item can function in the same manner to the user in all applications because the user interface provides standard software routines to handle these elements and reports the user's actions. The viewing script 365 with respect to the document 380 can be displayed along with descriptive text by the visualization engine 320. The virtual rendering can be employed to preview aspects of the job at a plurality of levels such as book, sheet, page, image, font, and rendering. The visual animated preview 325 of the document 380 provides a user with a virtual reality experience.

Figure 5:
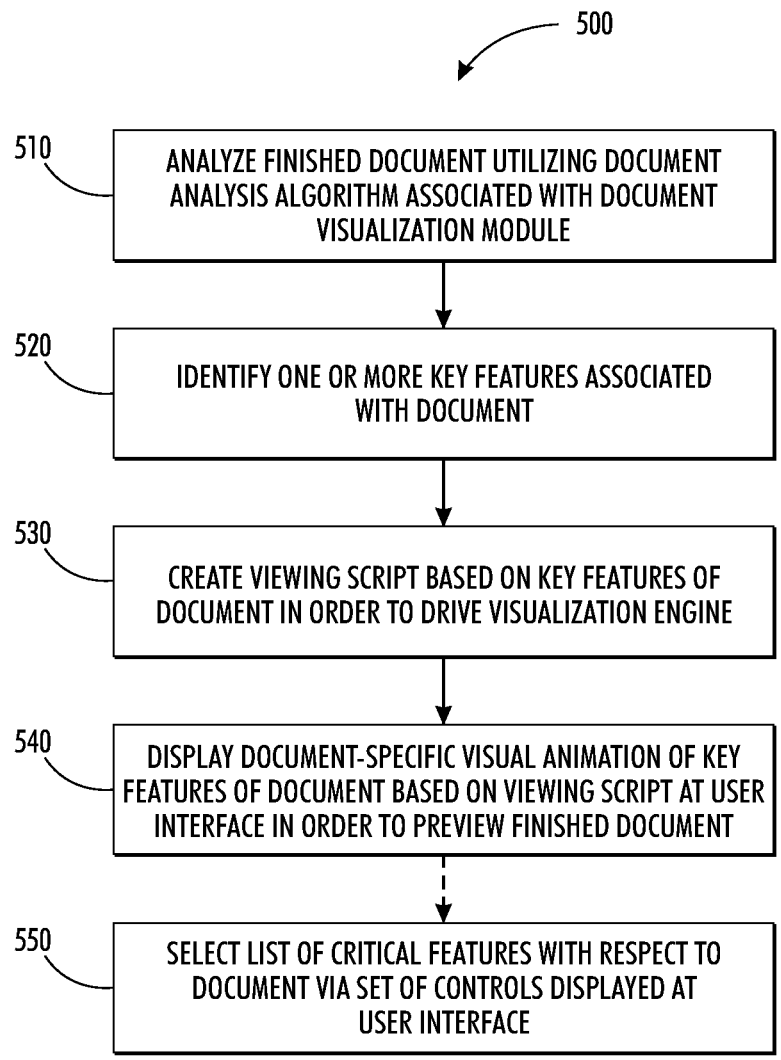
FIG. 5 illustrates a high level flow chart of operations illustrating logical operational steps of a method for providing the three-dimensional preview for the finished document based on a key feature analysis, in accordance with the disclosed embodiments.

FIG. 5 illustrates a high level flow chart of operations illustrating logical operational steps of a method 500 for providing the three-dimensional view with respect to the finished document 380, in accordance with the disclosed embodiments. The document 380 can be analyzed utilizing the document analyzing algorithm 360 associated with the document visualization module 220, as illustrated at block 510. The key features 370 associated with the document 380 can be identified utilizing the document-analyzing algorithm 360, as illustrated at block 520. The viewing script 365 with respect to the key features 370 associated with the document 380 can be created in order to drive the visualization engine 320, as depicted at block 530.

For example, consider a document with key features such as: a heavy stock cover with text and a photo, 40 pages of content in PDF format to be printed double-sided on 8½×11 inch paper, plastic divider pages after page 9 and 27, landscape format on pages 8 and 12, and page 35 is an 11×17 page with two folds and coil binding. The viewing script 365 for the document 380 can be generated by the visualization engine 320 along with descriptive text as shown below in TABLE 1:

TABLE 1

| Step | Visualization Display Script | Descriptive Text |
|---|---|---|
| 1 | Show Cover | Document Name, Document Author, Document Size |
| 2 | Open document to page 1 | Page View, standard paper |

TABLE 1-continued

| Step | Visualization Display Script | Descriptive Text |
|---|---|---|
| 3 | Skip forward to page 6-7 | Portrait format page |
| 4 | Advance to page 8-9 | Landscape format page |
| 5 | Advance to plastic divider page | Plastic divider |
| 6 | Advance to page 10-11 | Portrait format page |
| 7 | Advance to pages 12-13 | Landscape format page |
| 8 | Advance to pages 26-27 | Last page of section |
| 9 | Advance to plastic divider page | Plastic Divider |
| 10 | Advance to pages 28-29 | First page of section |
| 11 | Advance to page 34-35 | 11 × 17 fold-out page |
| 12 | Advance to back cover | Back cover |
| 13 | Close back cover | Back view |
| 14 | Rotate document back to front view | Coil Binding view |

The document-specific visual animation of the key features 370 can be visually displayed based on the viewing script 365 at the user interface 400 in order to preview the finished document 380, as indicated at block 540. The list of critical features with respect to the document 380 can be selected and previewed by the user via the set of media controls 330 displayed at the user interface 400, as illustrated at block 550. Note that the operation depicted at block 550 is optional. That is, in a simplest embodiment, a user can allow the viewing script to run without interacting with any of the controls described herein or selecting any critical features. The "optional" aspect of FIG. 5 is indicated by the dashed arrow shown between blocks 540 and 550.

The script 365 results in the 3D/2D visual animation of the key features 370 of the entire document 380, thus permitting an unskilled user in navigating a 3-D rendered scene to take advantage of the improved ability to preview their finished document that 3-D or 2-D rendering provides. Such an approach 500 facilitates speed document preparation and permit users to produce new and interesting documents without having to learn the technology and vocabulary of the rendering industry.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media, FLASH drives, USB drives, etc.), system memory such as, but not limited to, Random Access Memory (RAM), and communication media such as computer and telephone networks including, for example, Ethernet, the Internet, wireless networks, other networked systems.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for providing a preview of a finished document, said method comprising:
    analyzing a finished document utilizing a document analysis algorithm associated with a document analysis module wherein said document analysis module is associated with a document visualization module in order to identify a plurality of key features associated with said finished document;
    creating a viewing script with respect to said plurality of key features associated with said finished document in order to drive a visualization engine;
    visually displaying a document-specific visual animation indicative of said plurality of key features based on said viewing script wherein said visual animation visually displays aspects of said finished document at a plurality of levels; and
    adding comments, logic flow analysis, and flowcharting associated with said finished document to said visual display.

2. The method of claim 1 wherein said visualization engine comprises a two-dimensional visualization engine.

3. The method of claim 2 wherein visually displaying said document-specific visual animation indicative of said plurality of key features based on said viewing script in order to thereafter select said at least one feature with respect to said finished document in order to preview said finished document, further comprises:
    displaying a two-dimensional visual animation of said plurality of key features associated with said finished document at said user interface in order to preview said finished document;
    selecting a plurality of critical features associated with said finished document; and
    providing a plurality of media controls configured for previewing said plurality of critical features wherein said media controls comprise at least one of:
    a selection means;
    a play/stop control;
    a pause control;
    a skip control;
    a jump control configured to all selection of a document characteristic;
    a rewind control;
    a zoom control; and
    a mark control.

4. The method of claim 1 wherein said visualization engine comprises a three-dimensional visualization engine.

5. The method of claim 4 wherein visually displaying said document-specific visual animation indicative of said plurality of key features based on said viewing script in order to thereafter select said at least one feature with respect to said finished document in order to preview said finished document, further comprises:
    visually displaying a three-dimensional visual animation of said plurality of key features associated with said finished document at said user interface in order to preview said finished document;
    selecting a plurality of critical features associated with said finished document; and
    providing a plurality of media controls configured for previewing said plurality of critical features wherein said media controls at least one of:
    a selection means;
    a play/stop control;
    a pause control;
    a skip control;
    a jump control configured to all selection of a document characteristic;
    a rewind control;
    a zoom control; and
    a mark control.

6. The method of claim 5 further comprising displaying a viewing script with respect to said finished document along with a descriptive text by said visualization engine.

7. The method of claim 6 further comprising configuring said plurality of key features to include at least one of the following types of features:
- a binding type;
- a change in material;
- a change in page orientation;
- a location of a production page exception;
- a tab presence;
- a chapter break; and
- a cover material and content.

8. The method of claim 7 wherein visually displaying a document-specific visual animation indicative of said plurality of key features based on said viewing script wherein said visual animation provides preview aspects of said finished document at a plurality of levels further comprises:
- modeling said finished document;
- creating a layout and animation representative of a motion and a placement of said finished document;
- rendering said document-specific visual animation;
- creating a video sequence on a server; and
- transmitting said video sequence to a client.

9. The method of claim 8 further comprising creating said video sequence prior to transmitting said video sequence to said client.

10. The method of claim 8 further comprising streaming said video sequence as said video sequence is being created.

11. The method of claim 8 further comprising creating said video sequence in response to a user action with respect to said client.

12. A system for providing a preview of a finished document, said system comprising:
- a processor;
- a data bus coupled to said processor; and
- a computer-usable medium embodying computer code, said computer-usable medium being coupled to said data bus, said computer program code comprising instructions executable by said processor and configured for:
  - analyzing a finished document utilizing a document analysis algorithm associated with a document analysis module wherein said document analysis module is associated with a document visualization module in order to identify a plurality of key features associated with said document;
  - creating a viewing script with respect to said plurality of key features associated with said document in order to drive a visualization engine;
  - visually displaying a document-specific visual animation indicative of said plurality of key features based on said viewing script wherein said visual animation visually displays aspects of said finished document at plurality of levels; and
  - adding comments, logic flow analysis, and flowcharting associated with said finished document to said visual display.

13. The system of claim 12 wherein said instructions for visually displaying a document-specific visual animation indicative of said plurality of key features based on said viewing script wherein said visual animation visually displays aspects of said finished document at a plurality of levels are further configured for:
- modeling said finished document;
- creating a layout and animation representative of a motion and a placement of said finished document;
- rendering said document-specific visual animation;
- creating a video sequence on a server; and
- transmitting said video sequence to a client.

14. The system of claim 12 wherein said visualization engine comprises a two-dimensional visualization engine.

15. The system of claim 14 wherein said instructions are further configured for:
- displaying a two-dimensional visual animation of said plurality of key features associated with said finished document at said user interface in order to preview said finished document;
- selecting a plurality of critical features associated with said finished document; and
- providing a plurality of media controls configured for previewing said plurality of critical features wherein said media controls comprise at least one of:
  - a selection means;
  - a play/stop control;
  - a pause control;
  - a skip control;
  - a jump control configured to all selection of a document characteristic;
  - a rewind control;
  - a zoom control; and
  - a mark control.

16. The system of claim 12 wherein said visualization engine comprises a three-dimensional visualization engine.

17. The system of claim 16 wherein said instructions are further configured for visually displaying a three-dimensional visual animation of said plurality of key features associated with said finished document at said user interface in order to preview said finished document;
- selecting a plurality of critical features associated with said finished document; and
- providing a plurality of media controls configured for previewing said plurality of critical features wherein said media controls comprise at least one of:
  - a selection means;
  - a play/stop control;
  - a pause control;
  - a skip control;
  - a jump control configured to all selection of a document characteristic;
  - a rewind control;
  - a zoom control; and
  - a mark control.

18. The system of claim 17 wherein said instructions are further configured for displaying a viewing script with respect to said finished document along with a descriptive text by said visualization engine.

19. The system of claim 18 wherein said instructions are further configured for designating said plurality of key features to include at least one of the following types of features:
- a binding type;
- a change in material;
- a change in page orientation;
- a location of a production page exception;
- a tab presence;
- a chapter break; and
- a cover material and content.

20. A system for providing a preview of a finished document, said system comprising:
- a processor;
- a data bus coupled to said processor; and
- a computer-usable medium embodying computer code, said computer-usable medium being coupled to said data bus, said computer program code comprising instructions executable by said processor and configured for:

analyzing a finished document utilizing a document analysis algorithm associated with a document analysis module wherein said document analysis module is associated with a document visualization module in order to identify a plurality of key features associated with said finished document;

creating a viewing script with respect to said plurality of key features associated with said finished document in order to drive a visualization engine comprising a two-dimensional visualization engine or a three-dimensional visualization engine;

visually displaying a document-specific visual animation indicative of said plurality of key features based on said viewing script wherein said visual animation visually displays aspects of said finished document at a plurality of levels; and adding comments, logic flow analysis, and flowcharting associated with said finished document to said visual display.

* * * * *